JOHN BROUGHTON.

Improvement in Lubricators.

No. 4,593. Reissued Oct. 17, 1871.

Witnesses,

A. D. Smith.

D. J. Brown

John Broughton,
assignor to
Henry Moore,
by his attorney,
J. S. Brown.

AM. PHOTO-LITHOGRAPHIC CO. N.Y. (OSBORNE'S PROCESS.)

UNITED STATES PATENT OFFICE.

JOHN BROUGHTON, OF NEW YORK, N. Y., ASSIGNOR, BY MESNE ASSIGNMENTS, TO HENRY MOORE, OF SAME PLACE.

IMPROVEMENT IN LUBRICATORS.

Specification forming part of Letters Patent No. 45,694, dated January 3, 1865; reissue No. 4,593, dated October 17, 1871.

*To all whom it may concern:*

Be it known that JOHN BROUGHTON, of the city of New York, has invented certain new and useful Improvements in Lubricators; and I, HENRY MOORE, of the city, county, and State of New York, sole assignee of all right, title, and interest in and to the said improvements and the Letters Patent granted therefor, do hereby declare that the following is a full and exact description thereof, reference being had to the accompanying drawing making part of this specification.

Figure 1:
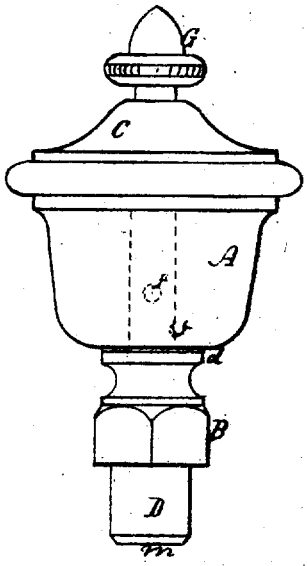
Figure 2:
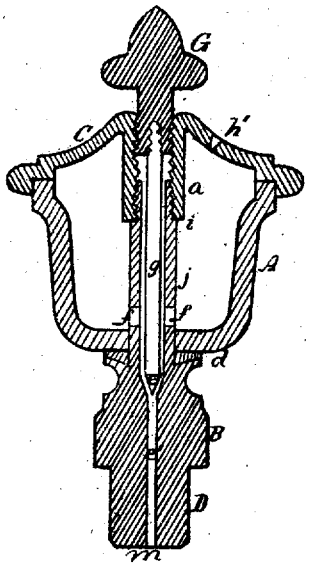
Figure 7:
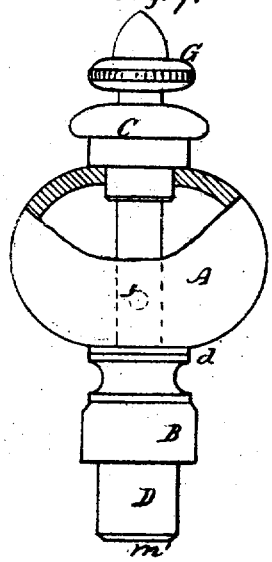
Figure 3:
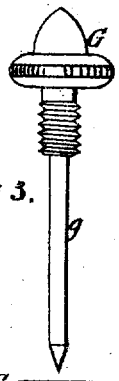
Figure 4:
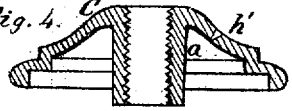
Figure 5:
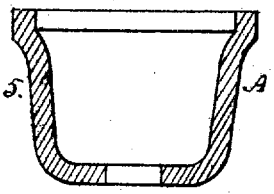
Figure 6:
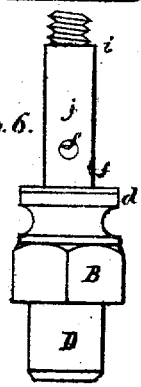

Figure 1 is a side view or elevation of the improved lubricator; Fig. 2, a central vertical section of the same; Figs. 3, 4, 5, and 6, respectively, views of the parts thereof separated; Fig. 7, a side view of a modified form of the lubricator.

Like letters designate corresponding parts in all of the figures.

This invention consists in several features of improvement in lubricators or oil-cups, whereby the cap and base or shank are firmly and rigidly connected together, independently of the cup or reservoir; and whereby a separate detachable cup or reservoir, which may be of glass or other transparent material, of any desired shape, is employed, and is held in place, without danger of fracture, by expansion or contraction, and without leakage; and whereby a superior lubricator, combining the features of a transparent body and graduated feed, is produced at a small cost, and capable of being easily and cheaply repaired in case of fracture of the reservoir, all substantially as hereinafter specified The main parts of this lubricator are the cup or reservoir A, the base or shank B, the cap or cover C, and the feed-vale and stopple G. The cup or reservoir A, which is preferably made of glass or other transparent material, so that the quantity of oil contained therein may be seen at all times, but may be made of metal, cast, stamped, or spun into form, is a complete vessel of itself, except that it has an aperture in its bottom to fit upon the base around the connection between the cap and base. It has any desired or convenient form, and is freely detachable from the other parts of the lubricator. The base or shank B has a shoulder, *d*, in which the bottom of the reservoir or glass cup rests, the joint being packed by a gasket or washer of cork or its equivalent. It has a plain or screw-stem, D, for attaching it to the part to be lubricated. The cap C has a bearing-surface on its under side, which fits upon the upper edge of the cup or reservoir. The base B and cap C are connected inside of the reservoir and through the aperture in the bottom thereof by a rigid connection, which, as shown, is composed of an upward projection, *j*, from the base and a downward projection, *a*, from the cap, one or both, the two screwed together, so that, in fact, these two parts of the lubricator meet and are united. The purpose is to make this interior connection between the cap and base rigid and strong, and to firmly support the cap entirely independent of the reservoir, which is clamped between the said cap and base when the two are screwed together. Thus not only is the reservoir free to adjust itself between the cap and base, and to expand and contract by heat and cold independently and without danger of fracture, since none of the necessary strength and support of the lubricator are placed upon it; but it is very simple in form and cheap of construction, and is very readily removed and replaced in case of breakage, and at slight cost. In order to guard against a too forcible clamping of the reservoir between the base and cap the screw-connection between the latter may be limited by a shoulder, *i*, accurately adapted to a uniform height of reservoirs, which in that case would be required. In order to transmit the oil from the reservoir to the part to be lubricated, and to apply the valve for regulating the flow of the oil, the base B and its projection *j* are perforated with a vertical perforation, the aperture being of greater diameter in its upper part to receive the valve-rod *g*, with space around the same for the passage of the oil, and this enlarged part terminating at the bottom in a conical seat, *e*, in which the conical end of the valve fits, and the part *e'* of the aperture below the valve-seat being smaller, generally just sufficient to transmit the oil to the outlet *m'*. Side apertures *f f*, opening into the main passage, are made in the projection *j*, or tubular base-and-cap connection, at or near the bottom of the reservoir, inside, and at points above, if desired, for the delivery of the oil to the said main passage. A small vent-orifice, *h'*, is made through the cap C to admit air into the reservoir as the oil is drawn therefrom, and to allow the expulsion of air in filling the reservoir with oil. The valve has a milled head or thumb-piece at the top, which is provided with a screw-thread, to screw into the top of the cap C, for regulating the action of the valve. When the valve is thereby screwed down close upon the seat *e* it wholly retains the oil, as when the machine to which the lubricator is applied is not in motion or action. Then, by turning back the screw to a certain extent, the valve is slightly raised, and can thus be accurately adjusted so as to supply uniformly the quantity of oil required or desired for the lubrication, as a certain number of drops in a given time. The screw-head of the valve also furnishes a stopper to close the central aperture in the cap. When a reservoir is to be removed or replaced, or access is to be gained to the interior thereof, the cap is unscrewed from the base.

For a small, compact, and very cheap lubricator the style shown in Fig. 7, with a globular reservoir, is advantageously used, every part being reduced to its smallest size and utmost simplicity.

The principal advantages of this lubricator may be recapitulated and enumerated as follows: First, it is a very simple lubricator in construction for enabling a glass or transparent reservoir to be used, and a complete regulator to the feed. Second, by having the metallic parts independently connected and self-supporting the glass reservoir is protected from fracture either by too forcible compression between or violence to the metallic parts. Third, it allows a free separate expansion and contraction of the glass reservoir and of the metallic parts, one independent of the other. Fourth, by the simple and cheap construction of an independent and complete glass cup or reservoir, and the independent, firm, and rigid connection of the cap and base; the reservoir, if broken, is readily replaced at a small cost by any one of ordinary intelligence, making the lubricator as good as before.

What I claim as the invention of the said JOHN BROUGHTON, and desire to secure by Letters Patent, is—

1. The base or shank B and cap C connected firmly and rigidly together by the interior projections or connection, substantially as and for the purposes herein specified.

2. The independent detachable cup or reservoir A, in combination with the rigidly centrally-connected base B and cap C, substantially as and for the purposes herein specified.

3. The combination of the valve G with the tubular-connected projections *a j* of the cap and base, in the manner and for the purpose herein specified.

4. The cup or reservoir A, with its bottom aperture arranged in combination with the base or shank B, with its shoulder *d* and packing-gasket or washer thereon, substantially as and for the purpose herein specified.

5. The lubricator, composed of the reservoir A having a simple bottom aperture, the base B having a shoulder, *d*, and packing-washer, on which the reservoir rests, the cap C rigidly connected with the base inside of the reservoir, and the valve G operating in the connection of the cap and base, substantially as and for the purpose herein specified.

HENRY MOORE.

Witnesses:
JOHN LANDMANN,
J. S. BROWN.

(87)